United States Patent
Barlsen et al.

(10) Patent No.: US 8,655,568 B2
(45) Date of Patent: Feb. 18, 2014

(54) METHOD, SYSTEM AND CONTROL DEVICE FOR CONTROLLING A COMPRESSED AIR CONTROLLED BRAKE SYSTEM

(75) Inventors: Holger Barlsen, Langenhagen (DE); Rainer Risse, Pattensen-Reden (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 13/821,493

(22) PCT Filed: May 17, 2011

(86) PCT No.: PCT/EP2011/002425
§ 371 (c)(1),
(2), (4) Date: Mar. 7, 2013

(87) PCT Pub. No.: WO2012/034608
PCT Pub. Date: Mar. 22, 2012

(65) Prior Publication Data
US 2013/0166158 A1     Jun. 27, 2013

(30) Foreign Application Priority Data

Sep. 17, 2010   (DE) .......................... 10 2010 045 655
Feb. 26, 2011   (DE) .......................... 10 2011 012 561

(51) Int. Cl.
*B60T 7/12*     (2006.01)

(52) U.S. Cl.
USPC .......................................................... 701/78

(58) Field of Classification Search
USPC .............................................. 701/50, 83, 78
See application file for complete search history.

(56) References Cited

U.S. PATENT DOCUMENTS

| | | | |
|---|---|---|---|
| 4,207,958 A | 6/1980 | Viall, Sr. et al. | |
| 6,260,880 B1 * | 7/2001 | Hada et al. | 280/735 |
| 6,323,441 B1 * | 11/2001 | Hager et al. | 177/1 |
| 6,424,907 B1 | 7/2002 | Rieth et al. | |
| 6,450,587 B1 | 9/2002 | MacGregor et al. | |
| 7,253,721 B2 | 8/2007 | Flohr et al. | |
| 7,739,020 B2 * | 6/2010 | Legner | 701/67 |
| 2002/0057194 A1 * | 5/2002 | Iwasaki et al. | 340/435 |
| 2003/0006644 A1 | 1/2003 | MacGregor et al. | |
| 2003/0033072 A1 * | 2/2003 | Nantz et al. | 701/93 |
| 2004/0145238 A1 * | 7/2004 | Seto et al. | 303/193 |
| 2005/0093366 A1 | 5/2005 | Elstad et al. | |
| 2005/0209763 A1 * | 9/2005 | Offerle et al. | 701/83 |
| 2007/0102997 A1 | 5/2007 | Cayer | |
| 2008/0245597 A1 * | 10/2008 | Paulson | 180/275 |
| 2008/0269997 A1 * | 10/2008 | Ezoe et al. | 701/70 |
| 2009/0057065 A1 * | 3/2009 | Akaki et al. | 187/223 |
| 2009/0102277 A1 * | 4/2009 | Ezoe et al. | 303/22.1 |
| 2009/0127042 A1 * | 5/2009 | Sedoni et al. | 188/3 H |
| 2009/0152052 A1 * | 6/2009 | Schoettke | 187/223 |
| 2009/0157235 A1 * | 6/2009 | Stebbins et al. | 701/3 |
| 2009/0233762 A1 * | 9/2009 | Choby | 477/94 |

FOREIGN PATENT DOCUMENTS

| | | |
|---|---|---|
| CA | 2 566 766 | 5/2007 |
| DE | 30 22 152 | 1/1982 |

(Continued)

*Primary Examiner* — Hussein A. Elchanti
(74) *Attorney, Agent, or Firm* — Kramer Levin Naftalis & Frankel LLP

(57) ABSTRACT

For a compressed-air-controlled vehicle brake system having at least one brake, a control process includes using a monitoring sensor to determine whether at least one component of the vehicle is not secured or is not properly positioned, and automatically activating the vehicle brakes in response to a determination that the at least one component is not secured and/or is improperly positioned.

17 Claims, 2 Drawing Sheets

(56) References Cited

FOREIGN PATENT DOCUMENTS

| DE | 41 21 720 | 1/1993 |
| DE | 43 42 732 | 6/1995 |
| DE | 199 04 216 | 1/2000 |
| DE | 10 2004 014 497 | 11/2005 |
| EP | 0 774 425 | 5/1997 |
| KR | 100 682 397 | 2/2007 |
| RU | 202 82 19 | 2/1995 |
| WO | WO 89/05248 | 6/1989 |
| WO | WO 01/94151 | 12/2001 |

* cited by examiner

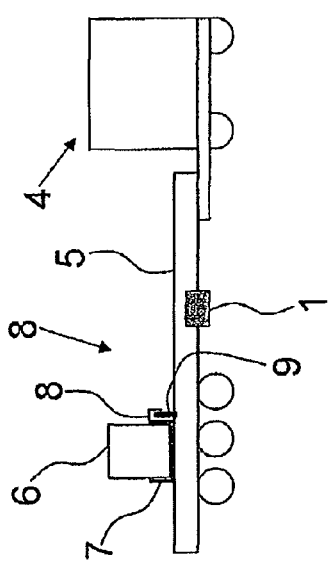
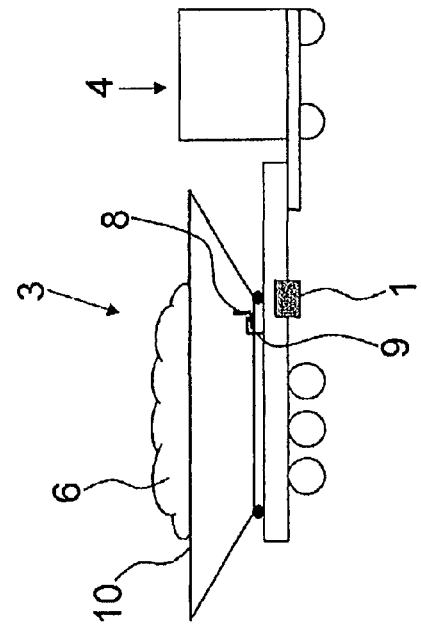
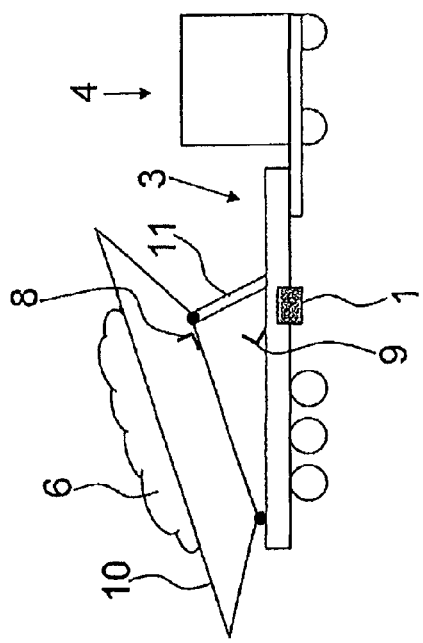

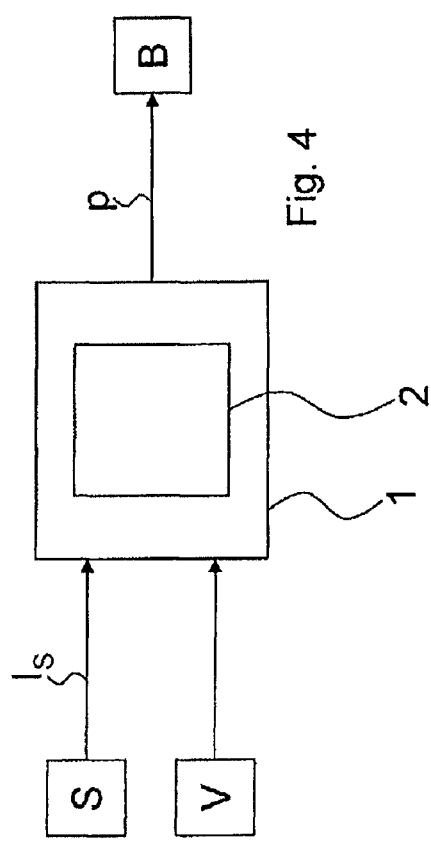
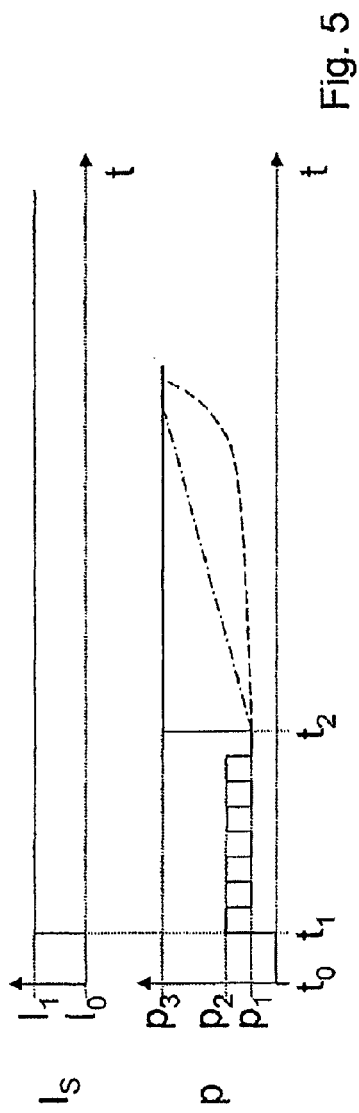

METHOD, SYSTEM AND CONTROL DEVICE FOR CONTROLLING A COMPRESSED AIR CONTROLLED BRAKE SYSTEM

FIELD OF THE INVENTION

The present invention generally relates to embodiments of a method and device for controlling a vehicle brake system, such as a compressed-air-controlled brake system. The device can be embodied in a control system that includes a monitoring sensor.

BACKGROUND OF THE INVENTION

In road traffic, there is a need to avoid vehicle states that present a danger to persons and objects. A possible source of danger is an unsecured or poorly secured load of a vehicle. In the field of utility vehicles, i.e., lorries and trailers, securing or locking mechanisms are provided for securing loads. However, there is the risk of the mechanisms not being used correctly or not being used altogether, resulting in the vehicle load being inadequately secured. This is the case, for example, if a rolling container located on a loading surface of the utility vehicle is not satisfactorily locked. In the case of tipper vehicles, this presents a risk if the tipper vehicle is driven with the tipper body in a raised position.

In other cases, insecure driving states can occur in road traffic if certain vehicle parts are not properly positioned. These driving states can include an opened fuel tank flap, an extended chassis container, and a raised chassis lifting platform.

SUMMARY OF THE INVENTION

Generally speaking, it is an object of the present invention to minimize dangers in road traffic due to, for example, inadequate securing of a load or incorrect positioning of vehicle parts. It is also an object of the present invention to alert the driver to such dangers.

According to one advantageous embodiment of the invention, a fully automatic function of the vehicle is integrated into a control device. When a potentially or currently unsafe driving state owing to unsatisfactory securing or positioning of a vehicle part or load is detected, the vehicle is braked to minimize possible dangers. In contrast to the stationary state, the driving state refers to the state in which the vehicle is in motion. It should be appreciated, however, that embodiments of the invention can also be employed when the vehicle is stationary.

The braking can be carried out in the form of light braking pulses that serve as a warning signal for the driver, as a genuine braking that leads to a reduction in the velocity of the vehicle, or as a combination thereof. This advantageously leads to an improvement in the safety in road traffic with only low expenditure on equipment and, in particular, without the need for intervention by a human operator. In particular, there is no need for any separate valves that have to be controlled manually to activate the brakes. In one embodiment of the invention, the functionality of a control device is extended, for example, in the form of a software extension, and at least one monitoring sensor is added. This permits a significant improvement in safety through comparatively low financial expenditure. In some cases, such sensors are already present in the vehicle, for example, in tippers, in the form of proximity switches on the tipper body that indicate the lowered position of the tipper body. In the stationary state of the vehicle, such sensors are used to lower the chassis during tipping by means of an electronic air suspension onto the buffers, referred to as the unloading level.

The embodiments of the present invention are suitable for all types of utility vehicles, including motorized vehicles (such as lorries with a loading surface and tippers), all types of trailer vehicles (either with a loading surface or a tipper body), and vehicle trains (formed from a motorized vehicle and one or more trailer vehicles). The load carrier for accommodating a load can be embodied, for example, as a container arranged on a loading surface of the utility vehicle, or as a tipper body for storing bulk material.

According to an aspect of the invention, a vehicle part, a load of the utility vehicle, or a load carrier can be monitored by the monitoring sensor. Vehicle parts that require particular positioning or securing include, for example, extendable parts of container chassis, a fuel tank flap, a lifting platform arranged on the chassis, and a tipper body.

Depending on the type of the utility vehicle, the monitoring sensor can be embodied differently. For example, if a locking mechanism is provided for securing a load, such as in rolling containers or tipper bodies with a locking means, the monitoring sensor can be advantageously configured to monitor the locking of the load carrier. In some applications, no locking means is necessary, such as, for example, in the case of certain tipper vehicles in which the tipper body is already held by its own weight. In such cases, the monitoring sensor can be advantageously configured to monitor the positioning of the load carrier. In one advantageous embodiment, the monitoring sensor is configured to monitor both the positioning and the locking thereof.

Accordingly, the monitoring sensor can be embodied as a locking sensor, a positioning sensor, or a combined locking/positioning sensor. In one advantageous embodiment of the invention, the monitoring sensor resides in or on the utility vehicle.

According to an embodiment of the invention, the monitoring sensor can be any one of a mechanical switch, an inductive proximity switch, a pressure sensor, and an optical sensor, such as, for example, a photoelectric barrier. The monitoring sensor can be connected directly to a control device via an electric line, a wireless data transmission link, or a vehicle bus system, such as, for example, a CAN bus. The monitoring sensor can also be part of another control unit or device in the utility vehicle.

According to one embodiment of the invention, a brake system control method automatically activates the brakes of a utility vehicle while in the driving state. In this context, at least at the start of the automatic activation of the brakes, the activation is effected only to serve as a warning signal to the driver of the vehicle, without decelerating, or only insignificantly decelerating, the vehicle. This has the advantage that active intervention in the driving behavior of the vehicle is not performed, or is at least not performed immediately, but the driver is instead only firstly warned by the activation of the brakes. The automatic activation of the brakes may be triggered by any type of signal or operating state of the vehicle and, in particular, the control device. Since there is only one warning signal, the signal can in principle be generated at any time in the case of a driving vehicle, without having adverse effects on road safety. The warning signal can therefore be triggered, for example, in the case of detection of excessive leakage of the compressed air system or in the case of an excessively high velocity.

According to one advantageous embodiment of the invention, the warning signal is generated by means of the automatic activation of the brakes when the monitoring sensor detects an improperly secured or positioned vehicle part, load, or load carrier.

According to another advantageous embodiment of the invention, at least at the beginning of the automatic activation of the brakes, the activation takes place in a pulsed fashion. The pulsed activation is effected such that the brake pressure is modulated to and fro between a lower pressure value and an upper pressure value, wherein the driving vehicle is not decelerated or is only decelerated insignificantly. Such pulsed activation of the brakes advantageously provides a warning signal that can be clearly recognized by the driver of the vehicle, and that can be easily differentiated from other vehicle movements. In this context, a low selection can be made for the lower pressure value, for example, zero bar or a low value that is different from zero. The lower pressure value can advantageously be in the region of the response pressure of the brakes, for example, at approximately 1.2 bar. The upper pressure value can be selected such that, as a result of the activation of the brakes, the vehicle is jolted in a manner that can be perceived by the driver, but that does not lead to any appreciable deceleration of the vehicle. The upper pressure value can be, for example, at or near 2.5 bar. The frequency of the pulsed activation of the brakes can advantageously be at or near 1 Hz.

According to one advantageous embodiment of the invention, the automatic activation of the brakes is effected during a first time period. In this embodiment, the vehicle is not decelerated or is only decelerated insignificantly during the first time period, and is decelerated significantly only after the first time period passes. The vehicle can be decelerated, after the first time period passes, down a predefined velocity value e.g., a limited velocity or the stationary state of the vehicle. The duration of the first time period may be, for example, 5 seconds. In this way, chronological staggering can be implemented between the warning signal, e.g., the slight activation of the brakes, and the activation of the brakes that leads to significant deceleration of the vehicle.

According to another advantageous embodiment of the invention, the automatic braking can be effective when the vehicle is stationary. In this embodiment, for example, the automatic activation of the brakes, which does not or only insignificantly decelerates the driving utility vehicle, is triggered at a velocity above a first minimum velocity. This has the advantage that, at relatively low velocities below the first minimum velocity, driving with improperly secured or positioned vehicle parts or loads does not lead to triggering of automatic braking. This allows, for example, a tipper with a raised tipper body to still be moved at a correspondingly low velocity (e.g., on a building site).

According to yet another advantageous embodiment of the invention, automatic activation of the brakes that significantly decelerates the driving utility vehicle is triggered at a velocity above a second minimum velocity that is higher than the first minimum velocity. In this way, staggering with respect to the velocity can also be implemented as an alternative to or in addition to the chronological staggering described above. Thus, various embodiments of the invention can be flexibly used in different types of utility vehicles.

According to a further advantageous embodiment of the invention, the automatic activation of the brakes is suppressed at a velocity above a third minimum velocity that is higher than the second minimum velocity. In this embodiment, when the vehicle velocity is greater than the third minimum velocity, only the part of the automatic activation of the brakes that significantly decelerates the vehicle is suppressed, thus retaining the warning signal. As a result, unsafe driving states, which can occur as a result of automatic activation of the brakes at a relatively high velocity, can be avoided.

In the various embodiments described above, the first minimum velocity can be, for example, 10 km/h, the second minimum velocity can be, for example, 20 km/h, and the third minimum velocity can be, for example, 40 km/h. According to one advantageous embodiment of the invention, the values for the first, second, and third minimum velocities, as well as the duration of the first time period, can be set and stored in a memory of the control device.

According to one advantageous embodiment of the invention, the automatic activation of the brakes can be effected such that the braking force is increased from an initial value to a final value with a transition function, wherein the final value is higher than the initial value. The transition function is advantageously configured such that a relatively slow transition occurs, thus permitting the driver of the utility vehicle to brake the vehicle as desired by means of operator control interventions. The transition function may be, for example, a function with a linear or progressive characteristic. According to one advantageous embodiment of the invention, during the automatic activation of the brakes, it is determined whether the driver of the utility vehicle is effecting activation of the brakes himself. If activation of the brakes by the driver is detected, the automatic activation of the brakes is aborted or at least interrupted for a certain waiting time period. This permits the driver of the utility vehicle to bring the utility vehicle to a standstill at the desired location under his own control, for example, when a warning signal is detected.

In one advantageous embodiment of the invention, the control device and the monitoring sensor are included as part of a system for controlling a compressed-air-controlled brake system of a utility vehicle. The monitoring sensor is configured to monitor whether a vehicle part, a load, or a load carrier that accommodates the load is secured or positioned properly. The control device has an electronic control unit that is connected by a signal input to the monitoring sensor. The electronic control unit is configured to effect automatic activation of the brakes if a triggering signal received from the monitoring sensor at the signal input indicates that the vehicle part, the load, or the load carrier is not secured or positioned properly. The electronic control unit is configured to carry out the above-mentioned methods, for example, by control software.

Still other objects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

The invention will be explained in more detail below by means of exemplary embodiments and using the accompanying drawings, in which:

FIG. 1 is a side view of an exemplary utility vehicle with a loading surface;

FIGS. 2 and 3 are side views of an exemplary utility vehicle with a tipper body in different positions;

FIG. 4 is a simplified schematic diagram of a brake system control device and a monitoring sensor; and FIG. 5 is a graphic illustration of profiles, with respect to time, of a monitoring sensor signal and a brake pressure.

DETAILED DESCRIPTION OF THE PREFERRED EMBODIMENTS

FIG. 1 shows a utility vehicle that includes a traction machine 4 and a trailer 3. The trailer may be embodied, for example, as a tow bar trailer or as a semitrailer. A control device 1, for example, in the form of a trailer electronic braking system (or EBS), is arranged on the trailer vehicle 3. The EBS is distinguished in that it carries out the complete pneumatic brake control in the trailer vehicle and is configured, in particular, to activate the brakes of the trailer vehicle automatically when necessary, i.e., without a request from activation of the brake pedal by the driver.

The trailer vehicle also has a loading surface 5. A rolling container 7, in which a load 6 resides, is arranged on the loading surface 5. The rolling container is secured to the loading surface by means of a locking mechanism. The locking mechanism has a load-carrier-side locking element 8 and a trailer-vehicle-side locking element 9, which are detachably connected to one another.

FIGS. 2 and 3 show a utility vehicle 3, 4 that is embodied as a tipper. In contrast to the vehicle of FIG. 1, the trailer in FIGS. 2 and 3 does not have a loading surface, but instead has a tipper body 10 that can be raised and tipped on one side by means of a hydraulically activated telescopic mechanism 11, for example. FIG. 2 shows the vehicle with the tipper body raised, and FIG. 3 shows the vehicle with the tipper body lowered and locked satisfactorily. A load, for example, in the form of a building material (e.g., gravel, which is required on a building site) is also arranged in the tipper body.

As shown in FIGS. 2 and 3, the vehicle also has a locking mechanism that includes a load-carrier-side locking element 8 and a trailer-vehicle-side locking element 9. The locking element is, for example, pivotable and is pivoted into the open position as illustrated in FIG. 2 so as to release the lock. When the tipper body is lowered, the locking element is pivoted into a locking position in which engagement occurs behind the load-carrier-side locking element, and as a result the tipper body is locked.

The load-carrier-side locking element is securely connected to the load carrier 7, 10, and the trailer-vehicle-side locking element is securely connected to the trailer 3 or the utility vehicle.

FIG. 4 shows a schematic illustration of a trailer brake system control device 1 that has an electronic control unit 2. The electronic control unit carries out the automatic braking functions. The following specified input signals are fed to signal inputs of the electronic control unit. The control device is, in addition to the elements illustrated in FIG. 4, also connected to further components of the brake system such as, for example, a compressed air reservoir container, an electrical power supply and, if appropriate, to further sensors and operator control elements. FIG. 4 therefore only shows the components that are to be addressed for an explanation of the embodiments of the present invention.

An output signal $I_S$ of a monitoring sensor S and a velocity signal of a velocity sensor V are fed to the control device 1 as input signals. The velocity sensor V can be, for example, a wheel speed sensor that is provided for an anti-lock brake function. The control device determines the velocity of the vehicle from the velocity signal. On the output side, the control device is connected to brakes B of a compressed-air-controlled brake system of the vehicle. The control device automatically generates a brake pressure p and outputs it to the brakes.

The monitoring sensor V can be connected to the control device 1 directly via an electric line, a wireless data transmission link, or a vehicle bus system, such as, for example, a CAN-bus. The monitoring sensor V can also be part of another control unit or device in the vehicle.

FIG. 5 shows an exemplary time profile in the case of automatic activation of the brakes of the utility vehicle as a result of detection of unsatisfactory locking of the load carrier 7, 10. Starting at a time $t_0$, it is assumed that an output signal $I_S$, which has a value $I_0$, and which corresponds to satisfactory locking, will firstly be output by the monitoring sensor S. Accordingly, at this time, a brake pressure of p=0 will be output. At a time $t_1$, the monitoring sensor S outputs an output signal $I_S$, which has the value $I_1$, and which indicates unsatisfactory locking, for example, due to release of the locking as a result of incorrect operator control. When triggered in this way, the control device 1 begins to output a pulsed brake pressure signal. In this context, the brake pressure p is modulated to and fro between the values $p_1$ and $p_2$. For example, $p_1$ is 1.2 bar and $p_2$ is 2.5 bar.

After a certain time period, at a time $t_2$, the brake pressure p is automatically increased further, specifically to a value $p_3$, which is selected such that the vehicle is significantly decelerated by activation of the brakes. $p_3$ may have, for example, a value of 5 or 6 bar. The increase in the brake pressure p after the time $p_2$ can either take place suddenly, as illustrated by the unbroken line in FIG. 5, or gradually according to a time function, as illustrated as an approximately linear transition function by the dot-dashed line, or as illustrated as a progressive transition function by the dashed line. The time period for the transition function until the value $p=p_3$ is reached may be, for example, ten seconds.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for controlling a vehicle brake system, the vehicle brake system comprising at least one brake, the method comprising: determining whether at least one component of a vehicle is one of insecure and improperly positioned, and automatically activating the at least one brake in response to a determination that the at least one component is one of insecure and improperly positioned, wherein automatically activating the at least one brake comprises (i) during a first time period at a start of automatically activating at least one brake, activating the at least brake in a first manner that warns that the at least one component is one of insecure and improperly positioned, and (ii) after the first time period passes, activating the at least one brake in a second manner that reduces velocity of the vehicle.

2. The method according to claim 1, wherein automatically activating the at least one brake is effected while the vehicle is in a driving state, and wherein activating the at least one brake in the first manner is effected without substantially decelerating the vehicle.

3. The method according to claim 1, wherein activating the at least one brake in the second manner results in a greater deceleration of the vehicle than activating the at least one brake in the first manner.

4. The method according to claim 1, wherein automatically activating the at least one brake is effected only when a velocity of the vehicle is above a first minimum velocity.

5. The method according to claim 4, wherein when the velocity of the vehicle is above the first minimum velocity but less than a second minimum velocity, automatically activating the at least one brake is effected in the first manner, and wherein when the velocity of the vehicle is above the second minimum velocity, automatically activating the at least one brake is effected in the second manner.

6. The method according to claim 5, wherein automatically activating the at least one brake the second manner is effected only when the velocity of the vehicle is less than a third minimum velocity.

7. The method according to claim 6, wherein the third minimum velocity is higher than the second minimum velocity.

8. The method according to claim 1, wherein activating the at least one brake in the first manner comprises activating the at least one brake at an initial brake pressure value, and wherein activating the at least one brake in the second manner comprises activating the at least one brake at a final brake pressure value that is higher than the initial brake pressure value.

9. The method according to claim 1, wherein determining whether the at least one component is one of insecure and improperly positioned is effected using a monitoring sensor.

10. The method according to claim 1, wherein the at least one component comprises a load carrier, and wherein determining whether the at least one component is one of insecure and improperly positioned comprises determining whether the load carrier is locked in position.

11. The method of claim 1, wherein the brake system is a compressed-air-controlled brake system.

12. The method of claim 1, wherein the at least one component comprises at least one of a load, an extendable part of a container chassis, a fuel tank flap, a chassis lifting platform, and a tipper body.

13. The method of claim 1, wherein during the first time period, the automatic activation is effected in a pulsed fashion such that a brake pressure of the at least one brake is modulated between a lower pressure value and an upper pressure value.

14. A control system, comprising: a brake control device and a monitoring sensor, the monitoring sensor being configured to monitor at least one component of a vehicle and output a triggering signal when the at least one component is one of insecure and improperly positioned, the control device having an electronic control unit coupled to the monitoring sensor, the electronic control unit being configured to effect automatic activation of the at least one brake when the triggering signal is received from the monitoring sensor, wherein the automatic activation of the at least one brake is effected such that (i) during a first time period at a start of the automatic activation, the at least one brake is activated in a first manner that warns that the at least one component is one of insecure and improperly positioned, and (ii) after the first time period passes, the at least one brake is activated in a second manner that reduces velocity of the vehicle.

15. The control system according to claim 14, wherein the monitoring sensor is a locking sensor configured to monitor a locking position of the at least one component.

16. A control device comprising an electronic control unit configured to effect the method according to claim 1.

17. A control system comprising the control device according to claim 16, and a monitoring sensor configured to monitor the at least one component.

* * * * *